E. E. POSTON.
HOSE COUPLING.
APPLICATION FILED MAR. 29, 1916. RENEWED JAN. 15, 1919.
1,310,134.  Patented July 15, 1919.
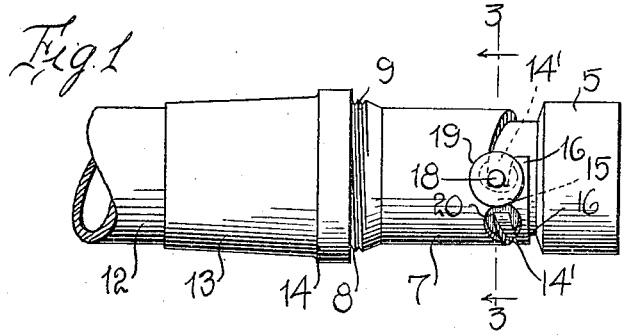
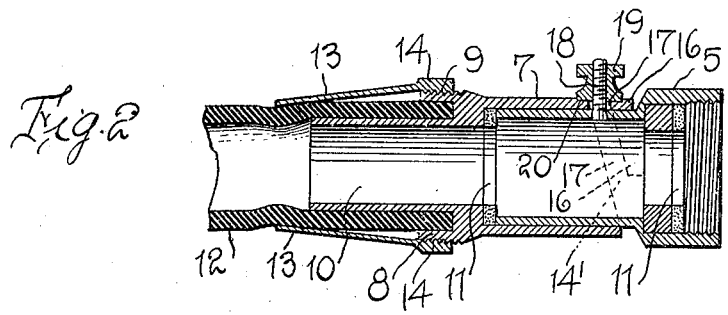
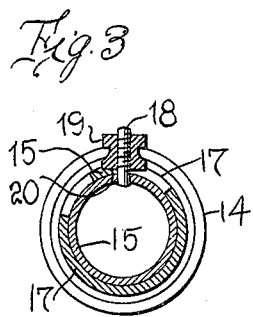
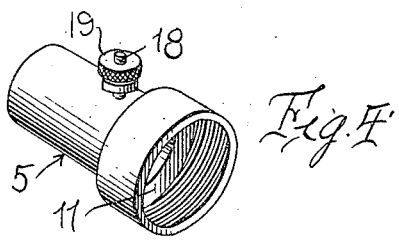
Inventor
E. E. POSTON
By Watson E. Coleman
Attorney

UNITED STATES PATENT OFFICE.

EMORY E. POSTON, OF CAMPBELL, CALIFORNIA.

HOSE-COUPLING.

1,310,134.  Specification of Letters Patent.  Patented July 15, 1919.

Application filed March 29, 1916, Serial No. 87,541. Renewed January 15, 1919. Serial No. 271,341.

*To all whom it may concern:*

Be it known that I, EMORY E. POSTON, a citizen of the United States, residing at Campbell, in the county of Santa Clara and State of California, have invented certain new and useful Improvements in Hose-Couplings, of which the following is a specification, reference being had to the accompanying drawings.

This invention relates to an improved hose coupling and has for its primary object to provide an exceedingly simple and effective device for coupling together hose sections, and effecting a water-tight connection between the same.

It is another object of the invention to provide a device of the above character including male and female coupling members, said female member having adjacent circumferentially extending obliquely inclined slots cut in its walls and extending in relatively opposite directions, and a threaded stud on the male member adapted to fit in any one of said slots and provided with a locking nut, said female member being recessed to receive the nut and effectually prevent the loosening or disconnection of the coupling members.

The invention has for a further general object to improve and simply the construction of hose coupling members of the above character, whereby the hose sections may be very easily and quickly coupled or uncoupled.

With the above and other objects in view, my invention consists in the novel features of construction, combination and arrangement of parts to be hereinafter more fully described, claimed and illustrated in the accompanying drawing, in which, Figure 1 is a side elevation of a hose coupler constructed in accordance with the preferred embodiment of my invention;

Fig. 2 is a longitudinal section thereof;

Fig. 3 is a section taken on the line 3—3 of Fig. 1; and

Fig. 4 is a detail perspective view of the male coupling member.

Referring in detail to the drawing, 5 designates the male coupling member which is connected to the end of one hose section 6 in any ordinary or approved manner, though it will be understood that this coupling member may also be provided with suitable means for connection to a lawn sprinkler.

The female coupling member 7 is provided upon its inner end portion with an enlarged, longitudinally projecting, annular flange 8 exteriorly threaded as at 9. At the juncture of this flange with the body of the coupling member, said member is formed with an internal annular flange with which the inner end of a longitudinally extending nipple 10 is integrally formed. This flange affords an internal shoulder against which the rubber gasket 11 seats. The space between the periphery of the nipple 10 and the projecting flange 8 affords an annular groove or channel to receive the end of the hose section 12. Over this end of the hose section, a metal sleeve 13 snugly fits, and one end of this sleeve is enlarged and thickened, as at 14, and provided with internal threads for engagement with the threads 9 on the exterior of the flange 8. The sleeve 13 is slightly tapered so that said sleeve will exert a clamping pressure upon the hose section 12.

The other end of the female coupling member 7 is obliquely cut, as at 14, and at the inner side or low point of this oblique end edge of the coupling member, the wall of said member is formed with a longitudinally projecting tongue 15 having arms 16 projecting transversely from each side thereof and in parallel relation to the obliquely inclined edge of the coupling member on opposite sides of said tongue. Thus, there is produced the short, circumferential slots or recesses 17 inclined in relatively opposite directions from the tongue 15.

The metal coupling member is adapted to snugly fit within the bore of the female member and is provided with a fixed, threaded stud 18. A locking nut 19 has threaded engagement upon this stud. The end of the male member is adapted to bear against the washer 10 within the female member and tightly clamp the same against the internal flange thereof. The surface of the female member at each of the slots 17 therein, is recessed, as shown at 20, to receive the inner end or base of the locking nut 19. Thus, the nut may be adjusted into tight frictional binding engagement upon the recessed wall of the female coupling member and held against slipping or accidental movement which would result in a disconnection of the coupling members, and said nut 19 also serves as a handle member for assembling the coupling.

In the use of the device, it will be understood that, after the female coupling member has been applied to the end of the hose section, the male coupling member is fitted therein and the stud 18 on said latter member engaged in either of the slots 17 by turning the coupling member in the proper direction. The nut 19 is then adjusted as above explained, so as to securely lock the parts in coupled relation.

From the foregoing description, taken in connection with the accompanying drawing, the construction, manner of operation and several advantages of my invention will be clearly and fully understood. The device is exceedingly simple, highly durable in its construction, and after the parts have once been coupled together, are not liable to accidental disconnection. The parts of the device may, of course, be made in various sizes, and the same variously modified as to the detail structural features thereof, and it will, therefore, be understood that I reserve the privilege of adopting all such legitimate changes as may be fairly embodied within the spirit and scope of the invention as claimed.

Having thus fully described my invention, what I desire to claim and secure by Letters Patent is:—

In a coupling, male and female coupling members, said female member having its outer end obliquely cut and provided with an outwardly directed tongue at the low point of said oblique cut, the outer end of said tongue having oppositely directed lateral and circumferentially directed arms, said arms coacting with the oblique edge of the female member at opposite sides of the tongue to afford slots, the inner walls of said slots being in continuity, a stud carried by the male coupling member and adapted to be received in one of said slots by a turning movement of said coupling members in either direction and being engageable with the oblique edge of the female member whereby relative separating movement is imparted to the male and female member when the stud is adjusted out of a slot, and a member threaded upon said stud and adapted to be adjusted into binding engagement with the female member, said last named member also serving as a handle for assembling the coupling, said female member at the inner end of each of the slots being provided on its outer face with a recess to receive the inner end portion of the last named member.

In testimony whereof I hereunto affix my signature in the presence of two witnesses.

EMORY E. POSTON.

Witnesses:
RALSTON ALISON,
ROY G. ARCHIBALD.

Copies of this patent may be obtained for five cents each, by addressing the "Commissioner of Patents, Washington, D. C."